United States Patent
Cunningham et al.

(10) Patent No.: US 9,175,626 B2
(45) Date of Patent: Nov. 3, 2015

(54) METHOD AND SYSTEM FOR CONTROLLING ENGINE VACUUM PRODUCTION

(71) Applicant: Ford Global Technologies, LLC, Dearborn, MI (US)

(72) Inventors: Ralph Wayne Cunningham, Milan, MI (US); Ross Dykstra Pursifull, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/630,445

(22) Filed: Feb. 24, 2015

(65) Prior Publication Data

US 2015/0167569 A1   Jun. 18, 2015

Related U.S. Application Data

(63) Continuation of application No. 13/104,153, filed on May 10, 2011, now Pat. No. 8,960,153.

(51) Int. Cl.

| | |
|---|---|
| *F02M 7/00* | (2006.01) |
| *F02D 41/04* | (2006.01) |
| *B60T 17/02* | (2006.01) |
| *F02D 9/02* | (2006.01) |

(Continued)

(52) U.S. Cl.
CPC ............ *F02D 41/04* (2013.01); *B60T 17/02* (2013.01); *F02D 9/02* (2013.01); *F02D 41/0002* (2013.01); *F02D 41/0032* (2013.01); *F02M 35/10229* (2013.01); *F02B 37/00* (2013.01); *F02D 13/0265* (2013.01); *F02D 2250/41* (2013.01); *F02M 35/10222* (2013.01); *Y02T 10/42* (2013.01)

(58) Field of Classification Search
CPC . Y02T 10/42; F02D 41/0002; F02D 13/0265; F02D 9/02; F02D 41/0032; F02D 2250/41; B60T 17/02; F02M 35/10222; F02M 35/10229; F02B 37/00
USPC ........................................................ 123/436
See application file for complete search history.

(56) References Cited

U.S. PATENT DOCUMENTS 2,264,126 A  * 11/1941 Wydler ..................... 123/559.2
2,721,629 A  * 10/1955 Saussard ...................... 188/356

(Continued)

FOREIGN PATENT DOCUMENTS

| EP | 0990793 A3 | 5/2000 |
| JP | 2005171925 A | 6/2005 |
| WO | 2008084311 A1 | 7/2008 |

OTHER PUBLICATIONS

Vetrovec, John, "Fluid-Dynamic Supercharger", SAE Technical Paper Series 2008-01-0299; World Congress, Detroit Michigan, Apr. 14-17, 2008; 15 Pages.

*Primary Examiner* — Hieu T Vo
*Assistant Examiner* — Arnold Castro
(74) *Attorney, Agent, or Firm* — Julia Voutyras; Alleman Hall McCoy Russell & Tuttle LLP

(57) ABSTRACT

A method for controlling engine vacuum production is disclosed. In one example, one or more air sources to an engine intake manifold are closed so as to increase an amount of air drawn from another air source. The method may increase a rate of vacuum supplied to a vacuum actuated device so as to improve operation of the vacuum actuated device.

20 Claims, 4 Drawing Sheets

(51) Int. Cl.
*F02D 41/00* (2006.01)
*F02B 37/00* (2006.01)
*F02D 13/02* (2006.01)
*F02M 35/10* (2006.01)

(56) References Cited

U.S. PATENT DOCUMENTS

| | | | | |
|---|---|---|---|---|
| 4,211,200 A * | 7/1980 | Rocchio et al. | ......... | 123/339.13 |
| 4,224,791 A * | 9/1980 | Ostwald | ......... | 60/397 |
| 4,541,396 A * | 9/1985 | Sato et al. | ......... | 123/518 |
| 5,005,550 A * | 4/1991 | Bugin et al. | ......... | 123/520 |
| 5,108,266 A * | 4/1992 | Hewitt | ......... | 417/87 |
| 5,183,023 A * | 2/1993 | Hanson | ......... | 123/520 |
| 5,676,101 A * | 10/1997 | Kawai et al. | ......... | 123/179.18 |
| 5,846,164 A * | 12/1998 | Harada | ......... | 477/205 |
| 6,095,116 A * | 8/2000 | Matsushita et al. | ......... | 123/350 |
| 6,120,414 A * | 9/2000 | Endo et al. | ......... | 477/185 |
| 6,244,676 B1 * | 6/2001 | Watanabe et al. | ......... | 303/191 |
| 6,334,834 B1 * | 1/2002 | Mizutani et al. | ......... | 477/203 |
| 6,347,608 B1 * | 2/2002 | Hara et al. | ......... | 123/179.4 |
| 6,536,850 B2 * | 3/2003 | Almkvist et al. | ......... | 303/115.3 |
| 6,557,524 B2 * | 5/2003 | Tsunooka | ......... | 123/399 |
| 6,568,175 B2 * | 5/2003 | Izumiura et al. | ......... | 60/284 |
| 6,735,942 B2 * | 5/2004 | Wild et al. | ......... | 60/397 |
| 6,754,579 B2 * | 6/2004 | Kamiya et al. | ......... | 701/112 |
| 6,773,374 B2 * | 8/2004 | Ogawa et al. | ......... | 477/183 |
| 6,857,415 B2 * | 2/2005 | Kayama et al. | ......... | 123/349 |
| 6,951,199 B2 | 10/2005 | Suzuki | | |
| 7,174,883 B2 * | 2/2007 | Sonoda et al. | ......... | 123/586 |
| 7,216,479 B2 * | 5/2007 | Tamura | ......... | 60/285 |
| 7,350,495 B2 * | 4/2008 | Harada | ......... | 123/184.24 |
| 7,475,951 B2 * | 1/2009 | Ichikawa | ......... | 303/12 |
| 7,610,140 B2 | 10/2009 | Hirooka | | |
| 7,650,221 B2 * | 1/2010 | Oi et al. | ......... | 701/103 |
| 8,087,397 B2 | 1/2012 | Cunningham et al. | | |
| 8,343,011 B2 | 1/2013 | Cunningham et al. | | |
| 8,353,266 B2 | 1/2013 | White et al. | | |
| 8,641,152 B2 | 2/2014 | Pursifull et al. | | |
| 8,683,800 B2 | 4/2014 | Cunningham et al. | | |
| 8,726,872 B2 * | 5/2014 | White et al. | ......... | 123/179.3 |
| 8,843,296 B2 | 9/2014 | Pursifull | | |
| 8,857,165 B2 | 10/2014 | Pursifull | | |
| 8,876,492 B2 | 11/2014 | Ulrey et al. | | |
| 8,960,153 B2 * | 2/2015 | Cunningham et al. | ......... | 123/436 |
| 2004/0182363 A1 * | 9/2004 | Suzuki | ......... | 123/339.11 |
| 2005/0000769 A1 * | 1/2005 | Hawener et al. | ......... | 188/356 |
| 2005/0231034 A1 * | 10/2005 | Kerns et al. | ......... | 303/191 |
| 2007/0295303 A1 * | 12/2007 | Hirooka | ......... | 123/339.23 |
| 2008/0121480 A1 * | 5/2008 | Kawamori et al. | ......... | 188/356 |
| 2008/0264059 A1 * | 10/2008 | Hirooka | ......... | 60/547.1 |
| 2008/0267789 A1 * | 10/2008 | Hirooka | ......... | 417/187 |
| 2010/0036566 A1 * | 2/2010 | Hayami | ......... | 701/48 |
| 2011/0132311 A1 * | 6/2011 | Pursifull et al. | ......... | 123/184.56 |
| 2011/0132336 A1 * | 6/2011 | Pursifull et al. | ......... | 123/568.11 |
| 2011/0174266 A1 * | 7/2011 | Cunningham et al. | ......... | 123/403 |
| 2011/0183812 A1 * | 7/2011 | Cunningham et al. | ......... | 477/183 |
| 2011/0203269 A1 * | 8/2011 | Karnik et al. | ......... | 60/547.1 |
| 2012/0016566 A1 * | 1/2012 | Cunningham et al. | ......... | 701/103 |
| 2012/0024261 A1 * | 2/2012 | Ulrey et al. | ......... | 123/336 |
| 2012/0035822 A1 * | 2/2012 | Mueller | ......... | 701/70 |
| 2012/0116656 A1 * | 5/2012 | Martin et al. | ......... | 701/110 |
| 2012/0237368 A1 | 9/2012 | Pursifull et al. | | |

\* cited by examiner

METHOD AND SYSTEM FOR CONTROLLING ENGINE VACUUM PRODUCTION

CROSS REFERENCE TO RELATED APPLICATIONS

The present application is a continuation of U.S. patent application Ser. No. 13/104,153, entitled "METHOD AND SYSTEM FOR CONTROLLING ENGINE VACUUM PRODUCTION," filed on May 10, 2011, now U.S. Pat. No. 8,960,153, the entire contents of which are hereby incorporated by reference for all purposes.

BACKGROUND/SUMMARY

Engine and vehicle actuators may be operated via vacuum or electrical energy. Electrical energy may be suitable for operating actuators that require a moderated amount of force; however, vacuum may be more suitable for operating actuators that may require higher levels of force such as vehicle brakes. Vacuum for operating actuators may be supplied via an engine intake manifold or a vacuum pump. An engine may provide vacuum via an intake manifold positioned in the engine air intake path between engine cylinders and an engine throttle. The pumping of engine cylinders may lower pressure in the intake manifold with respect to atmospheric pressure, thereby producing vacuum. However, engine air sources supplying air to the engine may affect the way vacuum is produced by the engine. For example, the engine throttle, engine crankcase ventilation system, EGR, and fuel vapor control system may affect the rate of vacuum production by the engine since the engine throttle and fuel vapor control system supply air to the intake manifold. In addition, the engine throttle and the fuel vapor control system may affect the level of vacuum produced by the engine. Further, choosing between liquid and gaseous fuels in a bi-fuel engine can also affect engine vacuum production. Consequently, if larger diameter hoses are used between vacuum system components to improve vacuum recovery rate of a vacuum system, the engine may not be able to provide vacuum at a desired rate and level.

The inventors herein have recognized the above-mentioned disadvantages and have developed an engine operating method, comprising: closing air sources to an engine intake manifold in response to a vacuum level, the air sources including a throttle; evacuating air from an air source supplying air to the engine intake manifold that is not closed; and opening at least one of the closed air sources in response to engine combustion stability degrading below a threshold level.

By restricting air flow or other gases flowing into the engine via closing gas sources capable of providing gas to the engine, the engine can be operated as a vacuum pump to quickly resupply a vacuum system with vacuum. In one example, a throttle supplying air to the engine may be closed in response to a brake booster vacuum level. The throttle may be at least partially reopened in response to a combustion stability level of the engine so that the possibility of engine emission degradation may be reduced during the vacuum recovery period.

The present description may provide several advantages. For example, the approach may reduce the possibility of engine stalls while increasing a rate of engine vacuum production. In addition, some cylinders of a multi-cylinder engine may be operated without fuel to produce vacuum while other cylinders operate with fuel to produce engine torque. Further, the engine may provide higher vacuum levels since the engine throttle can be closed during vacuum production. Further still, engine air sources can be opened in a predetermined order after being closed so as to prioritize operation of vacuum consumers.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
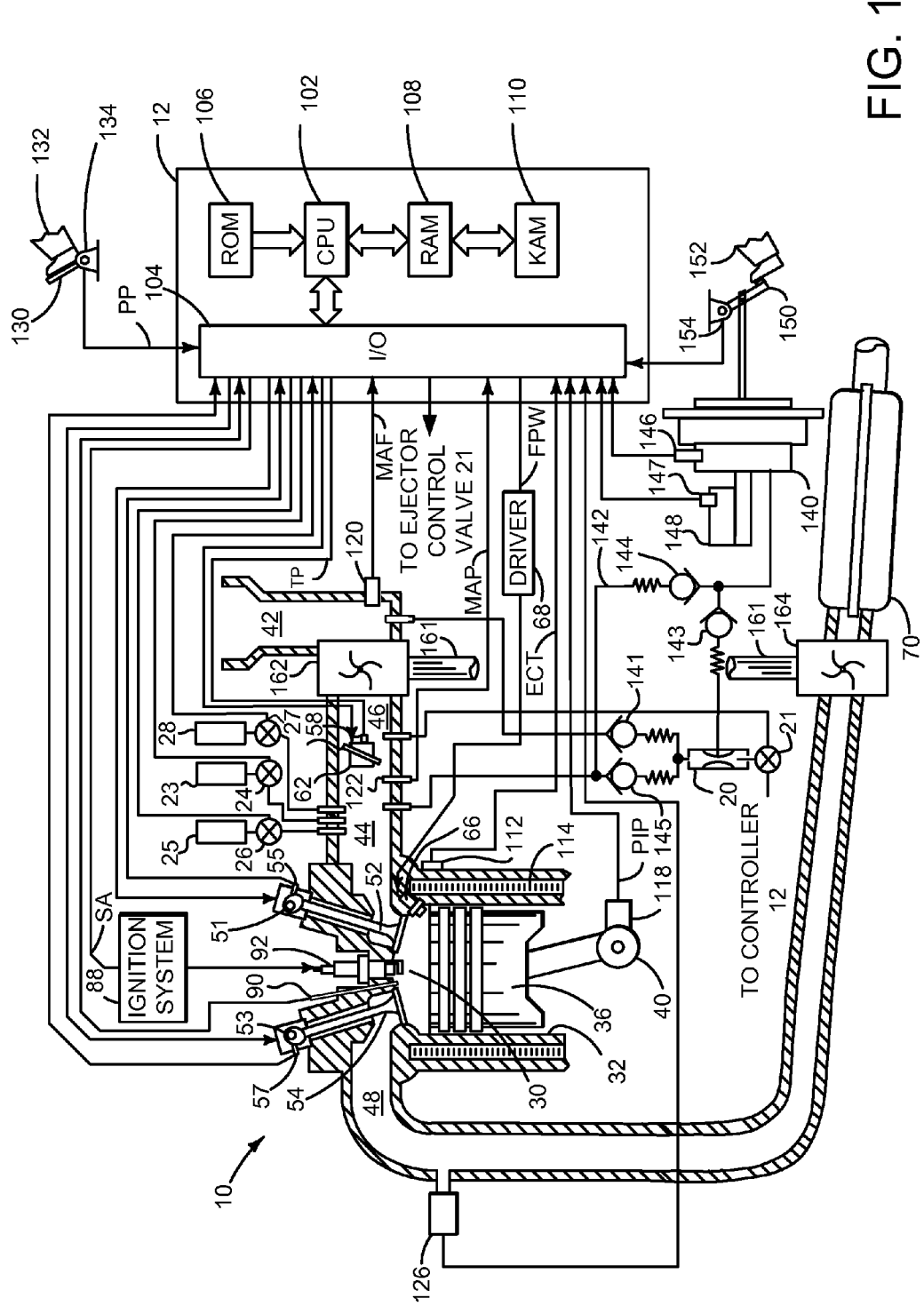
FIG. 1 shows a schematic depiction of an engine and vacuum system.

The present description is related to controlling production of vacuum by an engine. In one example, the engine provides vacuum to vacuum actuators of a vehicle. FIG. 1 shows one example of an engine and vacuum system.

Figure 2:
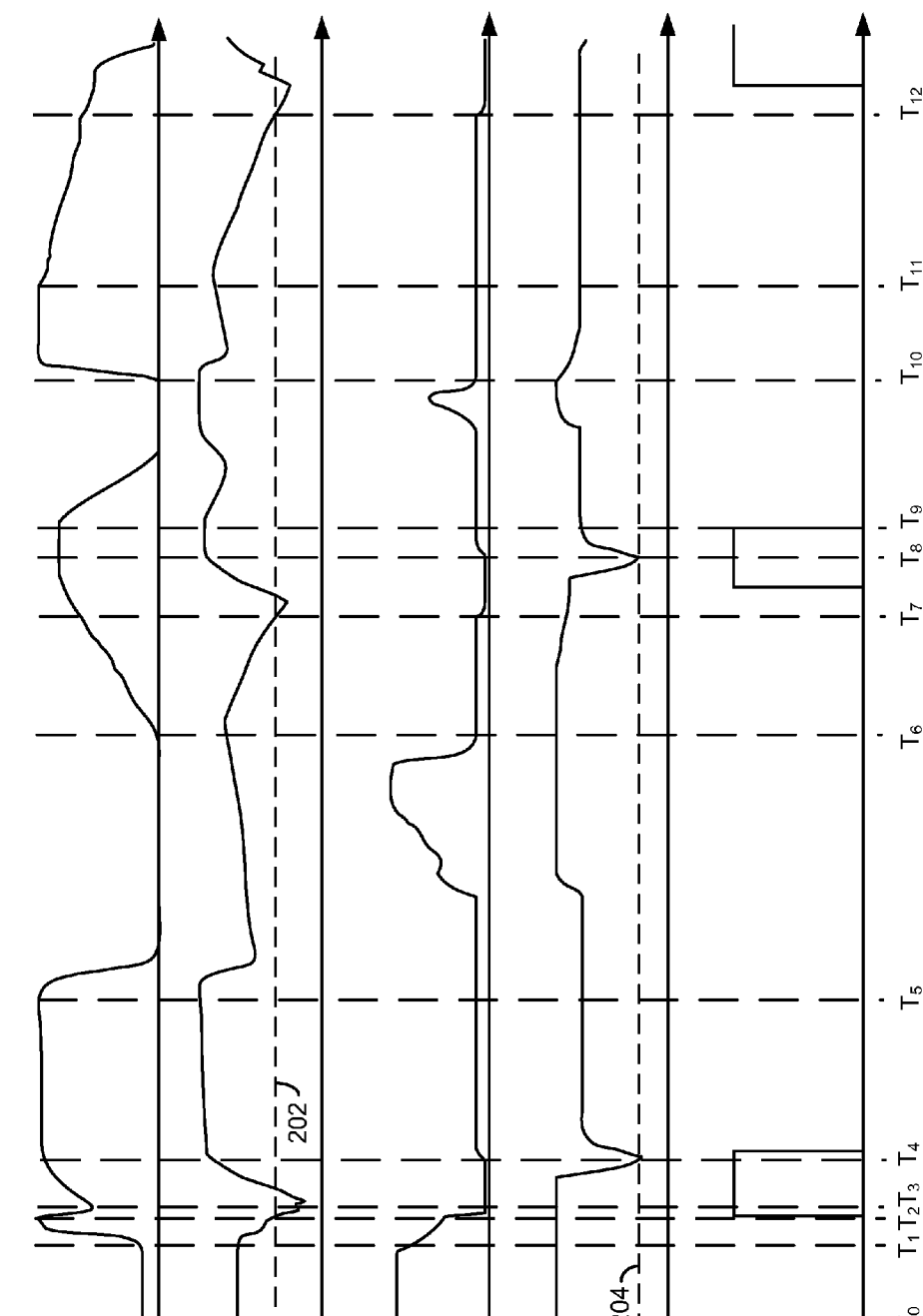
FIGS. 2 and 3 show simulated signals of interest during an engine operating sequence.
Figure 3:
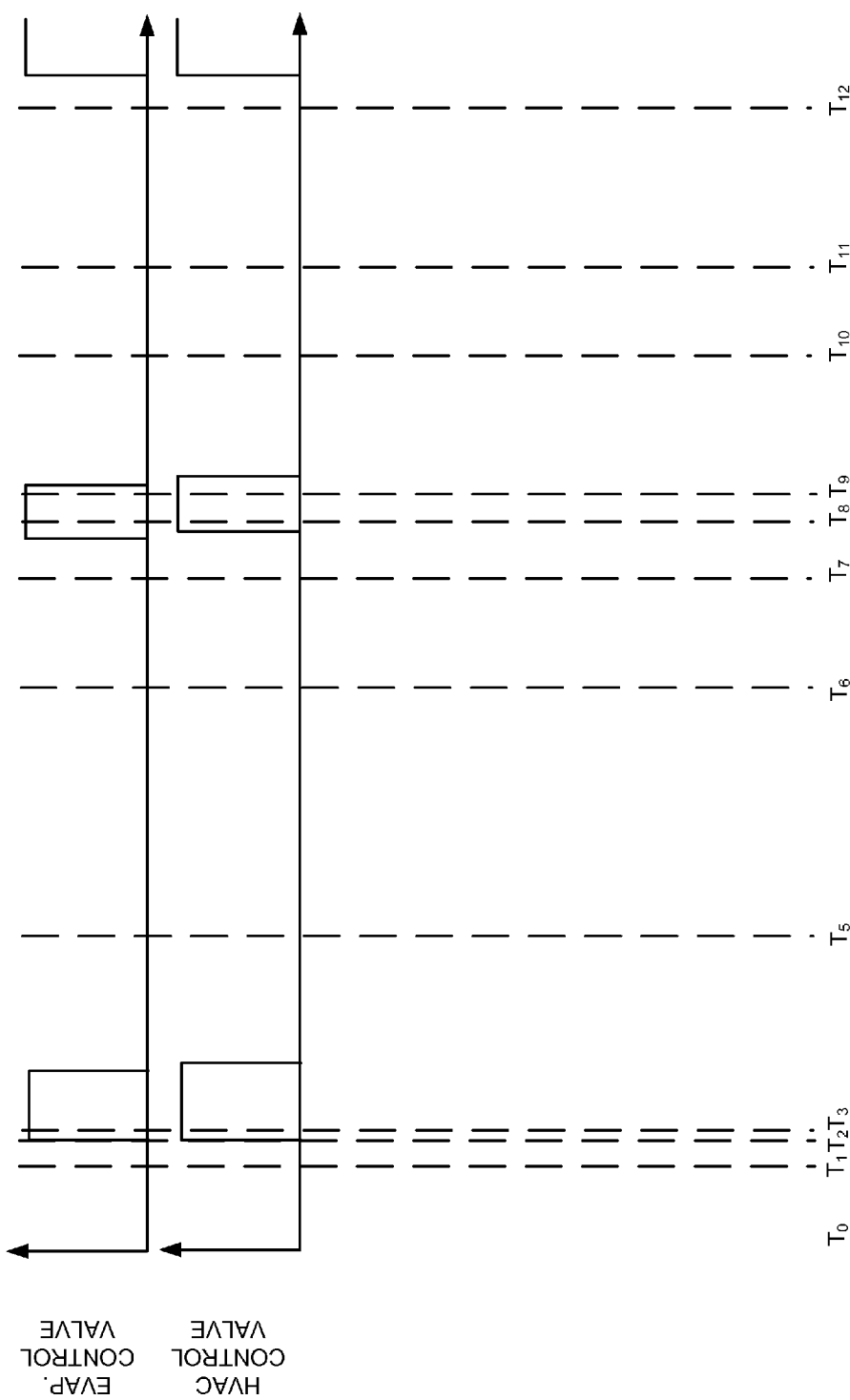
Figure 4:
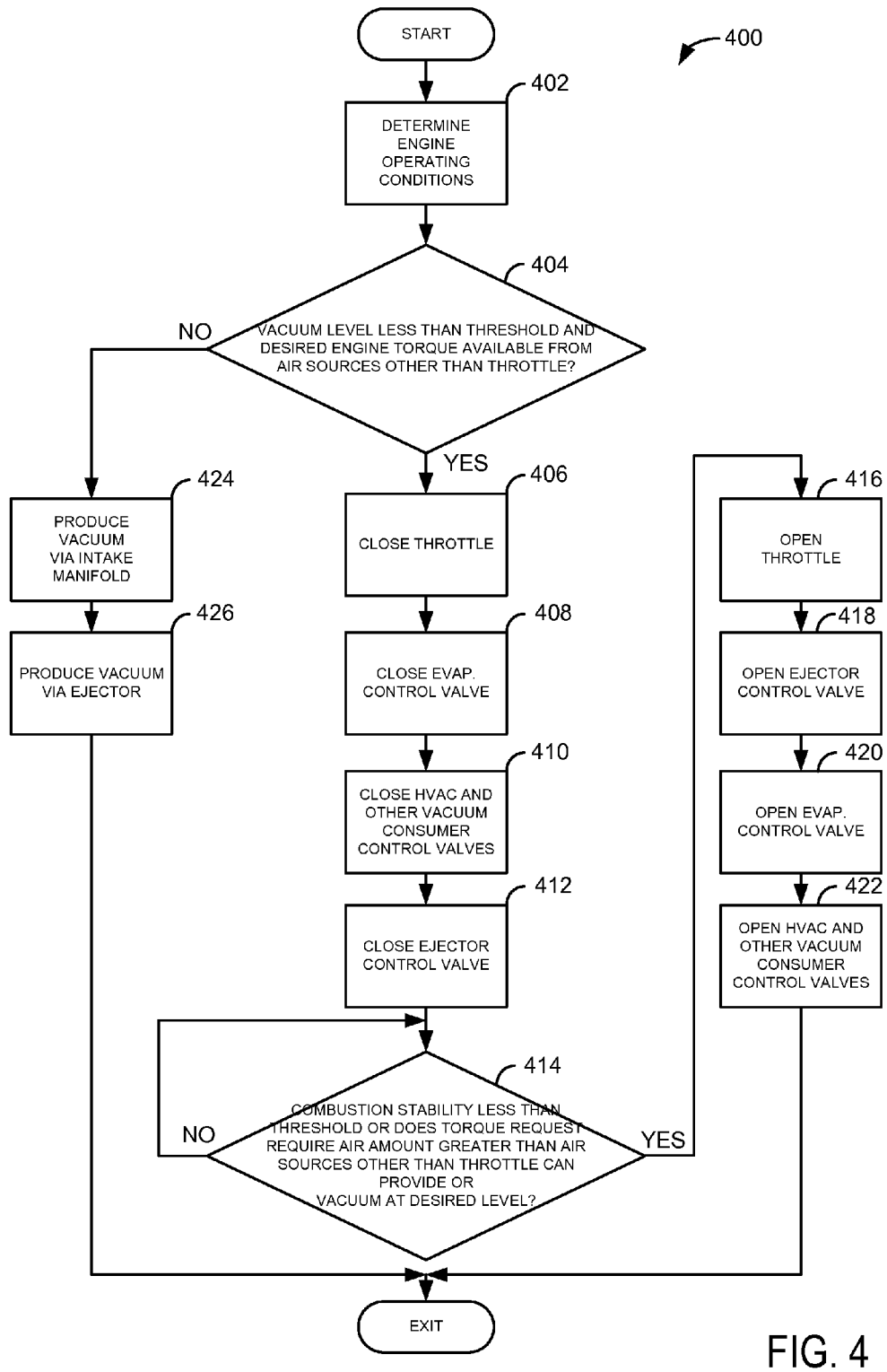
FIG. 4 shows flowchart of an example method for controlling engine vacuum production.

FIGS. 2-3 show simulated signals of interest while operating an engine and producing vacuum for a vacuum system. During selected engine operating conditions, air supplied via air sources can be interrupted from reaching the engine intake manifold and cylinders. Air supplied to the engine may be reinitiated when engine combustion stability is less than a threshold level. As a result, a vacuum level and rate of vacuum produced by the engine may be increased while the possibility of engine stalling may be reduced. FIG. 4 shows an example method for controlling air flow to the engine.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. Alternatively, one or more of the intake and exhaust valves may be operated by an electromechanically controlled valve coil and armature assembly. The position of intake cam 51 may be determined by intake cam sensor 55. The position of exhaust cam 53 may be determined by exhaust cam sensor 57.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width of signal FPW from controller 12. Fuel is delivered to fuel injector 66 by a fuel system (not shown) including a fuel tank, fuel pump, and fuel rail (not shown).

Fuel injector 66 is supplied operating current from driver 68 which responds to controller 12. In addition, intake manifold 44 is shown communicating with optional electronic throttle 62 which adjusts a position of throttle plate 64 to control air flow from intake boost chamber 46. Compressor 162 draws air from air intake 42 to supply boost chamber 46. Exhaust gases spin turbine 164 which is coupled to compressor 162 via shaft 161. A high pressure, dual stage, fuel system may be used to generate higher fuel pressures at injectors 66. Intake manifold 44 also provides vacuum to brake booster 140 via conduit 142. Check valve 144 ensures air flows from brake booster 140 to intake manifold 44 and not from intake manifold 44 to brake booster 140. Brake booster 140 amplifies force provided by foot 152 via brake pedal 150 to master cylinder 148 for applying vehicle brakes (not shown). Ejector 20 may also supply vacuum to brake booster 140 via check valve 143. Check valve 143 ensures air flows from brake booster 140 to ejector 20 and not from ejector 20 to brake booster 140. Ejector control valve 21 allows air to be directed from boost chamber 46 through ejector 20 and to intake manifold 44 or air intake 42 via check valves 145 and 141. In this way, air may be directed to the lowest pressure area in the engine intake system while ejector 20 is providing vacuum to the vacuum system.

A fuel vapor purging system comprising a fuel vapor canister 23 may hold stored fuel vapors from a fuel tank (not shown) or other fuel vapor sources. Evaporative emission control valve 24 allows air from the atmosphere to be drawn into fuel vapor canister 23 and into intake manifold 44 when open. Thus, air can be supplied to engine 10 when evaporative emission control valve 24 is open. The state of evaporative emission control valve 24 is adjusted via controller 12.

An engine crankcase ventilation system comprising an engine crankcase 25 may hold crankcase gases. PCV control valve 26 allows gases from the engine crankcase to be drawn into intake manifold 44 when open. Thus, crankcase gases can be supplied to engine 10 when PCV control valve 24 is open. The state of PCV control valve 26 is adjusted via controller 12.

HVAC actuators 28 can adjust heating and ventilation ducts when HVAC control valve 27 is open allowing air to flow from HVAC actuators 28. Thus, air can be supplied to engine 10 from HVAC actuators 28 when HVAC control valve 24 is open. The state of HVAC control valve 24 is adjusted via controller 12.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing accelerator position adjusted by foot 132; a position sensor 154 coupled to brake pedal 150 for sensing brake pedal position, an optional pressure sensor 90 for sensing cylinder pressure; a pressure sensor 146 for sensing brake booster vacuum; a pressure sensor 147 for sensing master cylinder pressure (e.g., hydraulic brake pressure); a knock sensor for determining ignition of end gases (not shown); a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120 (e.g., a hot wire air flow meter); and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some embodiments, the engine may be coupled to an electric motor/battery system in a hybrid vehicle. The hybrid vehicle may have a parallel configuration, series configuration, or variation or combinations thereof. Further, in some embodiments, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is described merely as an example, and that intake and exhaust valve opening and/or closing timings may vary, such as to provide positive or negative valve overlap, late intake valve closing, or various other examples.

Thus, the system of FIG. 1 provides for an engine with an intake manifold and at least one cylinder; a plurality of air sources providing air to the intake manifold, the plurality of air sources including an engine air intake throttle; and a controller, the controller including instructions for closing at least one of the plurality of air sources in response to a vacuum level and for opening the at least one of the plurality of air sources in response to engine combustion stability degrading below a threshold level. The engine controller also includes instructions for closing the engine air intake throttle in response to the vacuum level. The engine system further comprises a brake booster, and where the vacuum level is a vacuum level of the brake booster. The engine system further comprises an ejector and additional controller instructions to inhibit air flow to the ejector in response to the vacuum level. In another example, the engine system further comprises additional controller instructions for opening a group of the plurality of air sources in a predetermined order. The engine system also includes where the predetermined order includes opening the engine air intake throttle before other air sources in the group of the plurality of air sources.

Referring now to FIGS. 2-3, simulated signals of interest during an engine operating sequence are shown. The signals of FIG. 2 and FIG. 3 occur at the same time and during the same conditions. Vertical markers $T_0$-$T_{11}$ identify particular times of interest during the operating sequence and occur at the same time between FIGS. 2 and 3. The signals of FIGS. 2 and 3 may be provided via the system of FIG. 1 executing instructions according to the method of FIG. 4.

The first plot from the top of FIG. 2 shows brake actuator demand. The brake actuator demand may be made via a pedal as shown in FIG. 1 or via a signal from a controller. Brake actuator demand is at its lowest value at the bottom of the plot and increases in magnitude toward the top of the plot and in the direction of the Y axis arrow. The X axis represents time and time increases from the left to the right side of the plot.

The second plot from the top of FIG. 2 shows brake booster vacuum versus time. Time starts at the left side of the plot and increases to the right. Brake booster vacuum is at its lowest value at the bottom of the plot and increases toward the top of the plot in the direction of the Y axis arrow. Horizontal marker 202 represents a brake booster threshold vacuum in the second plot. In one example, one or more air sources supplying air to an engine are closed when brake booster vacuum is less than threshold 202.

The third plot from the top of FIG. 2 shows engine throttle position versus time (e.g. element 134 of FIG. 1). Time starts at the left side of the plot and increases to the right. The throttle opening increases in the direction of the Y axis arrow. The throttle is closed near the bottom of the third plot.

The fourth plot from the top of FIG. 2 shows engine combustion stability versus time. Time starts at the left side of the plot and increases to the right. In one example, combustion stability may be measured at a coefficient of variation of indicated mean effective pressure IMEP. Combustion stability increases in the direction of the Y axis arrow. Combustion stability decreases in near the X axis. The horizontal line 204 represents a threshold combustion stability level.

The fifth plot from the top of FIG. 2 shows a position of a normally open ejector control valve. The ejector control valve is open and allows air flow to the engine when the signal is at a low level. The ejector control valve is closed and inhibits air flow to the engine when the signal is at a higher level.

The first plot from the top of FIG. 3 shows a position of a normally open evaporative emission control valve. The evaporative emission control valve is open and allows air flow to the engine when the signal is at a low level. The evaporative emission control valve is closed and inhibits air flow to the engine when the signal is at a higher level.

The second plot from the top of FIG. 3 shows a position of a normally open heating, ventilation, and air conditioning (HVAC) control valve. The HVAC control valve is open and allows air flow to the engine when the signal is at a low level. The HVAC control valve is closed and inhibits air flow to the engine when the signal is at a higher level.

At time $T_0$, brake booster vacuum is at a relatively high level and the brake actuator demand is at a low level. The engine throttle position is also at a higher level indicating the engine and vehicle equipped with the engine is operating at cruise conditions. The combustion stability level is high indicating that the engine is receiving an adequate engine air amount. The ejector, evaporative emissions, and HVAC control valves are open indicating that air may be drawn to the engine intake manifold when intake manifold pressure is less than atmospheric pressure.

Shortly before time $T_1$, the throttle position begins to decrease and is indicative of a decreasing engine torque demand. The brake actuator demand begins to increase at time $T_1$ and is indicative of application of vehicle brakes to slow the vehicle. Applying the brake actuator causes air to enter the brake booster and the vacuum level decreases accordingly. The engine combustion stability remains at a higher level as air is available to engine cylinders. The ejector, evaporative emissions, and HVAC control valves remain open and allow air to flow to the engine.

At time $T_2$, the brake actuator is partially released allowing additional air to enter the brake booster. As a result, the brake booster vacuum level decreases further to the level of vacuum threshold 202. The engine throttle is closed in response to the brake booster vacuum being less than a threshold level while the engine torque demand is low. At the same time, the ejector, evaporative emissions, and HVAC control valves are closed so at to reduce the number of air sources delivering air to the engine. In other examples, the ejector, evaporative emissions, and HVAC control valves may be closed in a predetermined order based on priority of vacuum use. In this way, air can be pumped from the engine intake manifold at a higher rate than if all engine air source were continuing to supply air to the engine. It should be noted that not all engine air sources need be inhibited from supplying air to the engine. In the example of FIG. 2, the brake booster is an air source that remains in pneumatic communication with the engine intake manifold. Therefore, the engine cylinders can evacuate air from the engine intake manifold and the brake booster while other air sources including the engine throttle are substantially inhibited (e.g., some air flow may still pass by the engine throttle even though the engine throttle is closed due to clearances) from allowing air to flow to the engine. The engine combustion stability remains at a higher level.

At time $T_3$, the brake actuator demand increases again and air flows to the brake booster. The air also flows to the engine intake manifold since the brake booster remains in communication with the intake manifold. The throttle remains closed as do the ejector, evaporative emission, and HVAC control valves. Engine cylinders evacuate air from the engine intake manifold and the brake booster. After a short period of time, the brake booster and engine intake manifold reach a higher level of vacuum and engine combustion stability begins to degrade.

At time $T_4$, the engine combustion stability has degraded to a threshold level a 204. The engine throttle position is increased so as to allow additional air to flow to engine cylinders, thereby improving combustion stability. Further, a short time after the engine throttle position is increased, the ejector, evaporative emissions, and HVAC control valves are opened to allow additional air to the engine and provide vacuum to the ejector, evaporative emission system, and HVAC controls. The combustion stability level increases after the engine throttle is partially opened. The brake booster vacuum level remains at a high level and increases slightly as the ejector increases the vacuum level supplied to the brake booster. A check valve (e.g., 144 of FIG. 1) allows the engine intake manifold pressure to increase while brake booster vacuum level is maintained.

At time $T_5$, the brake actuator demand is released allowing air to flow into the brake booster. The vacuum in the brake booster does not reach the vacuum threshold 202. Therefore, the engine throttle, ejector control valve, evaporative emissions control valve, and the HVAC control valves remain open. The engine combustion stability also remains above combustion stability threshold 204.

Between time $T_5$ and time $T_6$, the engine throttle position increases as is indicative of vehicle acceleration. The engine combustion stability remains at a higher level and the engine air sources are in pneumatic communication with the engine intake manifold. Further, the brake booster vacuum level increases as vacuum is supplied to the brake booster via the ejector. The brake actuator demand remains inactive. The engine throttle partially closes to a level where air to idle the engine during warm operating conditions is delivered.

At time $T_6$, the brake actuator demand increases as is indicative of a request to slow a vehicle. The brake booster vacuum level decreases as air flows into the brake booster via applying the brake actuator. The engine combustion stability remains at a higher level and the ejector, evaporative emissions, and HVAC control valves remain open allowing air to flow to the engine via engine air sources.

Between time $T_6$ and time $T_7$, the brake actuator demand slowly increases allowing additional air to enter the brake booster. Accordingly, the brake booster vacuum continues to decrease.

At time $T_7$, the brake booster vacuum reaches threshold level 202. The engine throttle is closed so that engine cylinders pump air from the engine intake manifold and brake booster at an increased rate. Similarly, the ejector, evaporative emissions, and HVAC control valves are closed to increase the rate air is pumped from the engine intake manifold and brake booster.

At time $T_8$, the engine combustion stability degrades to threshold level 204. Consequently, the engine throttle is partially opened to allow additional air to engine cylinders. Further, the ejector, evaporative emissions, and HVAC control valves are commanded open in a predetermined order. The ejector control valve is opened followed by the evaporative emissions control valve and then by the HVAC control valve. The engine combustion stability increases shortly thereafter. However, in other examples priority to vacuum consumers may be in a different order. Further, in some examples, different vacuum consumers may be reactivated at different levels of vacuum within the system. For example, vacuum consumers may be reactivated or pneumatically coupled to a vacuum reservoir with each 0.1 bar decrease in vacuum after the combustion stability threshold has been reached.

At time $T_9$, the brake actuator demand is reduced allowing air to flow into the brake booster. Since the ejector has been activated by putting the ejector in pneumatic communication with the engine intake manifold, the ejector provides vacuum to the vacuum system. The throttle remains partially open supplying an engine idle air amount to engine cylinders. The ejector, evaporative emissions, and HVAC control valves remain open since the brake booster vacuum level is higher than vacuum threshold 202.

Between time $T_9$ and time $T_{10}$, the throttle position is increased and decreased as indicative of vehicle acceleration. The brake booster vacuum level stays high as no vacuum is consumed via brake actuator demand. The engine combustion stability level also remains at a higher level as there is adequate air supply to the engine cylinders.

At time $T_{10}$, the brake actuator demand is increased as is indicative of a request to slow a vehicle down. Air flows into the brake booster when the brake actuator is applied and so the brake booster vacuum level decreases. Since the ejector is active, additional vacuum may be provided via the ejector. In addition, additional vacuum may be provided to the brake booster via the engine intake manifold. The ejector, evaporative emissions, and HVAC control valves remain open since the brake booster vacuum level remains relatively high.

At time $T_{11}$, the brake actuator demand begins to slowly decrease as is indicative of slowly releasing a vehicle brake pedal. As a result, air enters the brake booster and slowly decreases the brake booster vacuum level. The engine throttle remains at a level where the engine and idle during warm engine operating conditions.

At time $T_{12}$, the brake booster vacuum level decreases to a level below the threshold level. Consequently, the engine throttle is closed and the ejector, evaporative emissions, and HVAC control valves are also close to increase the rate vacuum is provided to the brake booster. It should be noted that a vacuum reservoir or canister vacuum level may be monitored and the basis for stopping air flowing into the engine from engine air sources rather than the brake booster, if desired.

Referring now to FIG. 4, a flowchart of an example method for controlling engine vacuum production is shown. The method of FIG. 4 may be executed via controller instructions via the system of FIG. 1.

At 402, method 400 determines engine operating conditions. Engine operating conditions may include but are not limited to engine speed, engine cylinder air amount, ambient temperature and pressure, system vacuum levels, cylinder pressure, and throttle position. Method 400 proceeds to 404 after engine operating conditions are determined.

At 404, method 400 judges whether or not a vacuum level in the vehicle vacuum system is less than a threshold vacuum level and if a desired engine torque level is available from engine air sources other than the throttle (e.g., air presently in the intake manifold, brake booster air, vacuum reservoir air, evaporative emissions air, HV AC system air, or positive crankcase ventilation air). If so, method 400 proceeds to 406. Otherwise, method 400 proceeds to 424.

At 406, the engine throttle controlling air flow from the engine air intake to engine cylinders is closed. The engine throttle may be fully closed or partially closed. In examples, where the engine throttle is mechanically controlled, or where a bypass valve can route air around the throttle, the bypass valve may be closed. Method 400 proceeds to 408 after the throttle is closed.

At 408, method 400 closes the evaporative emissions control valve (e.g., 24 in FIG. 1). Closing the evaporative emissions control valve prevents air from flowing through an evaporative emissions canister and into the engine intake manifold. And, since the evaporative emissions control valve is in pneumatic communication with the engine intake manifold, loss of engine intake manifold vacuum may be prevented by closing the evaporative emissions control valve. Method 400 proceeds to 410 after the evaporative emission control valve is closed.

At 410, a HVAC control valve (e.g., 27 of FIG. 1) and/or other vacuum consumer control valves (e.g., PCV valve) may be closed. Closing the HVAC control valve prevents air from flowing through the HVAC actuator and into the engine intake manifold. And, since the HVAC control valve is in pneumatic communication with the engine intake manifold, loss of engine intake manifold vacuum may be prevented by closing the HVAC control valve. Method 400 proceeds to 412 after the HVAC control valve is closed.

At 412, method 400 closes an ejector control valve (e.g., 21 in FIG. 1). The ejector control valve is closed last after other engine air sources when production of additional vacuum is requested. The ejector control valve is closed last so that vacuum can be supplied by the ejector for a longer period of time. Closing the ejector control valve prevents air from flowing through the ejector. Vacuum may be produced by the ejector where air passes through the ejector. Thus, vacuum production by the ejector can be prevented by closing the ejector control valve. In addition, since the ejector is pneumatically coupled to the engine intake manifold, loss of engine intake manifold vacuum may be prevented by closing the ejector control valve. Method 400 proceeds to 414 after closing the ejector control valve.

From 406 to 412 engine air sources are inhibited from communicating with the engine intake manifold. The engine air sources may limit communication with the engine intake manifold in a predetermined order or substantially simultaneously. For example, when there is an operator torque request between a first and second threshold levels, the ejector, evaporative emissions, and HVAC control valves can be closed before the throttle so that the throttle can respond to operator input. In another example, where there is no operator torque request, the throttle can be closed before the evaporative emissions, HVAC, and ejector control valves. In other examples, the order in which the ejector, evaporative emissions, and HVAC control valves are closed may be varied depending on the amount of fuel vapors stored. For example, if a higher amount of fuel vapors are stored, the evaporative emissions control valve may be closed last, after the HVAC and ejector control valves, so that additional fuel vapors may be purged. In addition, engine air source control valves can be closed in response to vacuum levels in the vacuum system. For example, the evaporative emissions control valve may be closed when vacuum is at a first vacuum level. The ejector control valve may be closed when the vacuum is at a second level, the second level a higher vacuum level than the first vacuum level. Since different vacuum levels occur at different times, one valve may open at a later time than one or more of the other valves. In this way, priority may be provided to removing selected vacuum consumers from the vacuum system. Further, only a subset of engine air sources from 406 to 412 may be closed to increase vacuum production, if desired.

Engine spark may also be adjusted as engine air sources are closed and air from the closed engine air sources is prevented from entering the engine. In one example, spark may be advanced as engine air sources are closed. In other examples, engine spark advance may continue to be adjusted according to engine speed and intake manifold pressure.

It should also be mentioned that one or more cylinders may be deactivated by ceasing fuel delivery to the cylinder and/or closing cylinder intake valves. If engine cylinders are deactivated via closing intake valves, more air may be made available to active cylinders so that engine cylinder combustion stability may be at a higher level for a longer period of time.

At 414, method 400 judges whether or not engine combustion stability is less than an engine threshold combustion stability level or if the engine torque request requires more air than is available from air sources that have not been stopped from supplying air to the engine cylinders (e.g., the engine intake manifold and vacuum system vacuum reservoirs such as the brake booster). If so, method 400 proceeds to 416. Otherwise, method 400 returns to 414 until combustion stability degrades to a threshold level or until increased engine torque is requested.

At 416, method 400 at least partially opens the engine throttle. If the engine torque request has increased, the engine throttle position is adjusted to a level where the desired engine torque may be provided. If engine combustion stability has degraded to a threshold level, the engine throttle is opened to an amount where engine combustion stability is improved to a level greater than a threshold level. In examples where a bypass air valve around the engine throttle is present, the bypass valve may be opened.

At 418, method 400 opens the ejector control valve. Opening the ejector control valve allows additional air to flow to the engine and also allows for the generation of vacuum so that the vacuum level in the vacuum system may be increased. The ejector valve may be fully or partially opened in response to engine combustion stability degradation. Method 400 proceeds to 420 after the ejector control valve is opened.

At 420, method 400 opens the evaporative emissions control valve. Similar to the ejector control valve, opening the evaporative emissions control valve allows additional air to flow to the engine. Opening the evaporative emission control valve also allows for stored fuel vapors to be purged from the fuel system and combusted by the engine. The evaporative emissions control valve may be fully or partially opened in response to engine combustion stability degradation. Method 400 proceeds to 422 after the evaporative emissions control valve is opened.

At 422, method 400 opens the HVAC and/or other vacuum consumer control valves. HVAC system ducts may be controlled when air is allowed to flow from HVAC actuators to the engine intake manifold. The HVAC control valve may be fully or partially opened in response to engine combustion stability degradation. Method 400 proceeds to exit after the HVAC control valve is opened.

From 416 to 422 engine air sources are put in communication with the engine intake manifold. The engine air sources may establish communication with the engine intake manifold in a predetermined order or substantially simultaneously. For example, when there is an operator torque request the throttle may be opened before the ejector, evaporative emissions, and HVAC control valves. However, if there is no operator torque demand, the ejector control valve may be opened followed by the evaporative emissions control valve and then by the HVAC control valve. In other examples, the order in which the ejector, evaporative emissions, and HVAC control valves are opened may be varied depending on the amount of fuel vapors stored. For example, if a higher amount of fuel vapors are stored, the evaporative emissions control valve may be opened first so that additional fuel vapors may be purged. However, if the amount of fuel vapors stored is low, the ejector control valve may be opened first to provide additional vacuum. In addition, engine air source control valves can be opened in response to vacuum levels in the vacuum system. For example, the ejector may be opened when vacuum is at a first vacuum level. The evaporative emissions control valve may be opened when the vacuum is at a second level, the second level a higher vacuum level than the first vacuum level. In this way, priority may be provided to removing selected vacuum consumers from the vacuum system. In one example, where combustion stability is initially degraded, the engine throttle is opened at 416 when the desired engine air flow is less than a threshold and other vacuum consumers 418 to 422 remain closed so as to provide a higher vacuum level while improving combustion stability. In this way, the throttle may make fine adjustments to engine air flow to increase combustion stability while increasing vacuum production for the vacuum system.

At 424, method 400 produces vacuum for the brake booster and vacuum system vacuum reservoirs. Vacuum may be provided via the engine intake manifold when the engine throttle is partially closed. Check valves in the vacuum system (e.g., 143 and 144 of FIG. 1) may limit the direction of air flow in the vacuum system so as to ensure that the vacuum system reservoirs are at high vacuum levels when possible. Since the engine responds to operator torque requests it may be difficult at times for the engine to provide vacuum when desired. Method 400 proceeds to 426 after attempting to produce vacuum via the engine.

At 426, method 400 produces vacuum for the vehicle vacuum system via an ejector (e.g., 20 of FIG. 1). The ejector may provide vacuum when air passes through the ejector. Air passing through the ejector produces a low pressure region in the ejector allowing air from the vacuum system to be drawn to the ejector and evacuated from the vacuum system. Method 400 proceeds to exit after producing vacuum for the vacuum system via the ejector.

Thus, the method of FIG. 4 provides for an engine operating method, comprising: closing air sources, including a throttle, to an engine intake manifold in response to a vacuum level; evacuating air from an air source supplying air to the engine intake manifold that is not closed; and opening at least one of the closed air sources in response to engine combustion stability degrading below a threshold level. The engine operating method also includes where the air sources include a fuel vapor purging system, and where the air source that is not closed is a brake booster. In one example, the engine operating method includes where the air sources is an ejector. Further, according to the method, engine combustion stability is estimated via an intake manifold pressure or cylinder pressure. The engine operating method further comprises adjusting engine spark advance in response to an intake manifold pressure. The engine operating method also includes where closing of air sources includes closing a group of air sources at substantially the same time.

The method of FIG. 4 also provides for an engine operating method, comprising: closing air sources to an engine intake manifold in a predetermined order in response to a vacuum level, the air sources including a throttle; evacuating air from an air source supplying air to the engine intake manifold that is not closed; opening closed air sources in a predetermined order in response to engine combustion stability degrading below a threshold level. The engine operating method also includes where closing air sources to the engine intake manifold in a predetermined order includes closing a group of air sources at substantially a same time. The engine operating method also includes where closing air sources to the engine intake manifold in the predetermined order includes beginning to close an engine air intake throttle before other air sources. The engine operating method also includes where opening the closed air sources in a predetermined order in response includes beginning to open an engine air intake throttle before other air sources. In this way, a desired engine torque may be provided rapidly. The engine operating method further comprises deactivating at least one engine cylinder while evacuating air from the air source that is not closed. The engine operating method also includes where the vacuum level is predicted via an operating condition of a vehicle brake actuator. In another example, the engine operating method further comprises opening the closed air sources in response to a vacuum level greater than a threshold vacuum level.

As will be appreciated by one of ordinary skill in the art, the method described in FIG. 4 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used.

This concludes the description. The reading of it by those skilled in the art would bring to mind many alterations and modifications without departing from the spirit and the scope of the description. For example, single cylinder, I2, I3, I4, I5, V6, V8, V10, V12 and V16 engines operating in natural gas, gasoline, diesel, or alternative fuel configurations could use the present description to advantage.

The invention claimed is:

1. An engine operating method, comprising:
   closing air sources, including a throttle, to an engine intake manifold and deactivating one or more engine cylinders in response to a vacuum level;
   evacuating air from an air source supplying air to the engine intake manifold that is not closed; and
   opening at least one of the closed air sources in response to engine combustion stability degrading below a threshold level.

2. The engine operating method of claim 1, where the air sources include a fuel vapor purging system, and where the air source that is not closed is a brake booster.

3. The engine operating method of claim 1, where the air sources include an ejector, and wherein the air sources are closed in a predetermined order.

4. The engine operating method of claim 1, where engine combustion stability is estimated via an intake manifold pressure.

5. The engine operating method of claim 1, further comprising adjusting engine spark advance in response to an intake manifold pressure.

6. The engine operating method of claim 1, where closing of air sources includes closing a group of air sources at substantially the same time.

7. An engine operating method, comprising:
   closing air sources to an engine intake manifold in a predetermined order and deactivating one or more engine cylinders in response to a vacuum level, the air sources including a throttle;
   evacuating air from an air source supplying air to the engine intake manifold that is not closed;
   opening closed air sources in a predetermined order in response to engine combustion stability degrading below a threshold level.

8. The engine operating method of claim 7, where closing air sources to the engine intake manifold in a predetermined order includes closing a group of air sources at substantially a same time.

9. The engine operating method of claim 7, where closing air sources to the engine intake manifold in the predetermined order includes beginning to close an engine air intake throttle before other air sources.

10. The engine operating method of claim 7, where opening the closed air sources in a predetermined order in response includes beginning to open an engine air intake throttle before other air sources.

11. The engine operating method of claim 10, further comprising deactivating at least one engine cylinder while evacuating air from the air source that is not closed.

12. The engine operating method of claim 10, further comprising adjusting engine spark in response to engine intake manifold pressure.

13. The engine operating method of claim 7, where the vacuum level is predicted via an operating condition of a vehicle brake actuator.

14. The engine operating method of claim 7, further comprising opening the closed air sources in response to a vacuum level greater than a threshold vacuum level.

15. An engine system, comprising:
- an engine with an intake manifold and at least one cylinder;
- a plurality of air sources providing air to the intake manifold, the plurality of air sources including an engine air intake throttle; and
- a controller, the controller including instructions for closing at least one of the plurality of air sources and deactivating one or more engine cylinders in response to a vacuum level and for opening the at least one of the plurality of air sources in response to engine combustion stability degrading below a threshold level.

16. The engine system of claim 15, where the controller includes instructions for closing the engine air intake throttle in response to the vacuum level.

17. The engine system of claim 15, further comprising a brake booster, and where the vacuum level is a vacuum level of the brake booster.

18. The engine system of claim 15, further comprising an ejector and additional controller instructions to inhibit air flow to the ejector in response to the vacuum level.

19. The engine system of claim 15, further comprising additional controller instructions for opening a group of the plurality of air sources in a predetermined order.

20. The engine system of claim 19, where the predetermined order includes opening the engine air intake throttle before other air sources in the group of the plurality of air sources.

* * * * *